United States Patent
Brennan (10) Patent No.: US 10,137,679 B2
(45) Date of Patent: Nov. 27, 2018

(54) MATERIAL DEPOSITION SYSTEM FOR ADDITIVE MANUFACTURING

(71) Applicant: Raytheon Company, Waltham, MA (US)

(72) Inventor: Michael Brennan, McKinney, TX (US)

(73) Assignee: Raytheon Company, Waltham, MA (US)

( * ) Notice: Subject to any disclaimer, the term of this patent is extended or adjusted under 35 U.S.C. 154(b) by 310 days.

(21) Appl. No.: 14/926,645

(22) Filed: Oct. 29, 2015

(65) Prior Publication Data

US 2017/0120513 A1    May 4, 2017

(51) Int. Cl.
*B29C 67/00* (2017.01)
*B33Y 50/02* (2015.01)
(Continued)

(52) U.S. Cl.
CPC .............. *B33Y 50/02* (2014.12); *B28B 1/001* (2013.01); *B29C 47/10* (2013.01); *B29C 47/802* (2013.01); *B29C 47/92* (2013.01); *B29C 64/106* (2017.08); *B29C 64/386* (2017.08); *B33Y 30/00* (2014.12); *B29C 2947/922* (2013.01); *B29C 2947/926* (2013.01); *B29C 2947/92704* (2013.01); *B29K 2101/12* (2013.01); *B33Y 10/00* (2014.12)

(58) Field of Classification Search
CPC ..... B33Y 50/02; B29C 64/106; B29C 64/386; B29C 47/92; B29C 47/802; B29C 47/10
See application file for complete search history.

(56) References Cited

U.S. PATENT DOCUMENTS

| 5,121,329 A | 6/1992 | Crump |
| 6,165,406 A | 12/2000 | Jang et al. |

(Continued)

FOREIGN PATENT DOCUMENTS

| CN | 103240883 A | 8/2013 |
| CN | 103692652 A | 4/2014 |

(Continued)

OTHER PUBLICATIONS

Examination Report of the Taiwan Intellectual Property Office for Corresponding Taiwan Application 105125736 dated Aug. 10, 2017 including English translation.

*Primary Examiner* — Galen H Hauth
(74) *Attorney, Agent, or Firm* — Renner, Otto, Boisselle & Sklar, LLP (57) ABSTRACT

A material deposition system for additive manufacturing including an extruder and a measuring device for measuring the viscosity and/or other rheological properties of a build material contained within the extruder. The measuring device may provide feedback to a controller for controlling one or more parameters depending on the measured viscosity and/or other rheological properties of the build material within the extruder. Two or more feed materials may be supplied to the extruder and a mixing device may be configured to mix the feed materials within the extruder to create a blended deposition material. The mixing device may be operatively coupled to the measuring device for simultaneously measuring the viscosity and/or other rheological properties of the materials during mixing. The controller may be configured to independently control one or more parameters associated with the materials depending on the viscosity and/or other rheological properties measured by the measuring device.

19 Claims, 3 Drawing Sheets

(51) Int. Cl.
  *B28B 1/00* (2006.01)
  *B29C 47/10* (2006.01)
  *B29C 47/80* (2006.01)
  *B29C 47/92* (2006.01)
  *B33Y 30/00* (2015.01)
  *B29C 64/106* (2017.01)
  *B29C 64/386* (2017.01)
  *B33Y 10/00* (2015.01)
  *B29K 101/12* (2006.01)

(56) References Cited

U.S. PATENT DOCUMENTS

| | | |
|---|---|---|
| 8,827,684 B1 | 9/2014 | Schumacher et al. |
| 2006/0270806 A1* | 11/2006 | Hale .................. C08J 5/18 |
| | | 525/439 |
| 2009/0057938 A1* | 3/2009 | Zhang ............ B29C 45/7646 |
| | | 264/40.1 |
| 2013/0209600 A1 | 8/2013 | Tow |
| 2014/0070461 A1* | 3/2014 | Pax ................ B29C 67/0055 |
| | | 264/401 |
| 2014/0079841 A1 | 3/2014 | Pridoehl et al. |
| 2014/0265037 A1 | 9/2014 | Stirling et al. |
| 2014/0277661 A1 | 9/2014 | Amadio et al. |
| 2015/0044084 A1 | 2/2015 | Hofmann et al. |
| 2015/0093465 A1 | 4/2015 | Page |

FOREIGN PATENT DOCUMENTS

| | | |
|---|---|---|
| EP | 2727709 | 5/2014 |
| TW | 201433445 A | 9/2014 |

* cited by examiner

MATERIAL DEPOSITION SYSTEM FOR ADDITIVE MANUFACTURING

FIELD OF INVENTION

The present invention relates generally to additive manufacturing, and more particularly to a material deposition system for forming a three-dimensional object by additive manufacturing.

BACKGROUND

Additive manufacturing is a rapidly growing technology that is used to create reasonably accurate three-dimensional objects quickly. Current additive manufacturing techniques, such as fused-filament fabrication (FFF), are typically accomplished by forcing a polymer filament through a heated nozzle in an extrusion printhead, where the plastic feedstock is liquefied before or as it passes through the nozzle, and the feed pressure causes the material to be extruded through an exit orifice in the nozzle to form the three-dimensional object.

Existing FFF systems typically use a single extrusion printhead that extrudes a single filament of thermoplastic material. In order to change the material type or color to be deposited, the FFF process must be paused while a different filament is loaded and heated in the extrusion head. This may create termination points in the deposited material that can lead to stress concentrations, or may allow for cold flow lines that decrease the structural capability of the object being fabricated.

While current FFF deposition systems may control the feed rate and temperature of the filament material as it passes through the extrusion printhead, such FFF deposition systems lack the ability to mix multiple feedstock materials in a single extrusion head while simultaneously monitoring and controlling the viscosity and/or other rheological properties of the blended material contained in the extrusion head.

SUMMARY OF INVENTION

The present invention provides a material deposition system for additive manufacturing that includes an extrusion head and a measuring device for measuring the viscosity and/or other rheological properties of a build material contained within the extrusion head. The measuring device may provide feedback to a controller for controlling one or more parameters depending on the measured viscosity and/or other rheological properties of the build material contained within the extrusion head.

Two or more feed materials may be supplied to the extrusion head and a mixing device may be configured to mix the feed materials within the extrusion head to create a blended or alloyed deposition material. The mixing device may be operatively coupled to the measuring device, which may simultaneously measure the viscosity and/or other rheological properties of the feed materials and/or the blended deposition material during mixing. The controller may be configured to independently control one or more parameters associated with each of the feed materials and/or the blended deposition material depending on the viscosity and/or other rheological properties measured by the measuring device. For example, the controller may control one or more parameters such as temperature, feed rate, flow rate, mixing speed, etc. for effecting a change in the viscosity and/or other rheological property of the blended material to be deposited.

Such a system configuration enables improved feedback control for in-process adjustments to the composition and/or properties of the blended material contained in the extrusion head just prior to, or simultaneously with, deposition of the blended material. This allows for creating a three-dimensional object with multiple materials or variable ratio blends of different materials with only a single extruder.

More particularly, by simultaneously mixing the feed materials and measuring the viscosity and/or other rheological properties of the blended material, the desired degree of mix uniformity and/or alloyed composition of the blended material may be determined and achieved. This may be accomplished by providing feedback to the controller based on the viscosity and/or other rheological properties of the feed materials and/or the blended deposition material, as measured by the measuring device during mixing, and then adjusting parameters associated with the various materials to achieve the desired properties of the blend. Such features may be particularly advantageous when the feed materials are of different compositions or have different properties, such as melt points, melt viscosities, flow behaviors, etc., which may make it particularly difficult to predict the blend behavior.

Furthermore, by continuously measuring and altering the viscosity and/or other rheological properties of the blended material contained within the extrusion head, the size and/or shape of the extrusion bead may be tailored or optimized, and the consistency of the extrusion bead may be improved.

Also, by mixing and measuring the materials all within a single extrusion head, additional components and fluid circuitry may be eliminated or reduced, thereby minimizing costs of such deposition systems and possibly improving the speed for building such three-dimensional objects.

In general, the exemplary material deposition system enables improved in-process adjustment or changing of materials, colors and mix ratios while requiring only a single extrusion head and may eliminate or reduce the need for pauses or purging during the deposition process, which significantly improves the capabilities of fused-filament fabrication and other additive manufacturing systems.

According to an aspect of the invention, an additive manufacturing apparatus includes an extruder having an input port for supplying a build material, an extrusion port for extruding the build material, and a chamber interposed between the input port and the extrusion port for liquefying the build material.

A measuring device may be configured to measure the viscosity and/or other rheological properties of the liquefied build material contained within the chamber.

A controller may be configured to control one or more parameters depending on the viscosity and/or other rheological properties of the liquefied build material as measured by the measuring device.

According to an aspect of the invention, a material deposition system for additive manufacturing includes an extruder having two or more input ports for supplying two or more feed materials, a mixing chamber for receiving the two or more feed materials, a mixing device for mixing the two or more feed materials in the mixing chamber to create a blended deposition material, and an extrusion port for extruding the blended deposition material.

A measuring device may be configured to measure the viscosity and/or other rheological properties of the two or more feed materials and/or the blended deposition material in the mixing chamber.

A controller may be configured to control one or more parameters associated with the two or more feed materials and/or the blended deposition material depending on the viscosity and/or other rheological properties measured by the measuring device.

Embodiments of the invention may include one or more of the following additional features separately or in combination.

For example, the mixing device may include a static mixer, a dynamic mixer, or both.

The mixing device may be operatively coupled to the measuring device.

For example, the mixing device may be directly or indirectly connected or may be integral with the measuring device.

In some embodiments, the measuring device may include a viscometer for measuring viscosity.

The viscometer may be operatively coupled to the mixing device for measuring the torsional forces generated during the mixing of the two or more feed materials and/or the mixing of the blended deposition material.

In some embodiments, the measuring device may include a rheometer for measuring rheological properties.

For example, the mixing chamber may be cylindrical and the mixing device may extend along a longitudinal axis of the chamber and be spaced from an interior surface of the mixing chamber to define an annulus therebetween. The rheometer may be operatively coupled to the mixing device for measuring the torsional forces generated during the mixing of the two or more feed materials and/or the mixing of the blended deposition material in the annulus.

One or more heating elements may be configured to heat the two or more feed materials and/or the blended deposition material.

For example, the extruder may include liquefication passages or chambers associated with the respective input ports for receiving a respective one of the two or more feed materials, where each of the liquefication passages is in thermal communication with a corresponding heating element for heating and liquefying the respective feed materials, where each of the liquefication passages is configured to deliver the respective liquefied feed materials downstream toward the mixing chamber.

In some embodiments, the extruder may include a heating element in thermal communication with the mixing chamber for heating the blended deposition material.

The controller may include a temperature controller that is operatively coupled to the one or more heating elements for independently controlling temperature of the two or more feed materials and/or the blended deposition material depending on the viscosity and/or other rheological properties measured by the measuring device.

The material deposition system may include one or more actuators associated with the feed materials for feeding the respective feed materials into the extruder.

For example, the one or more actuators may include stepper motors.

The controller may include a feed controller that is operatively coupled to each of the actuators for independently controlling feed rate of each of the two or more feed materials into the mixing chamber depending on the viscosity and/or other rheological properties measured by the measuring device.

The controller may include a flow controller configured to control flow rate of the blended deposition material extruded from the extrusion port depending on the viscosity and/or other rheological properties measured by the measuring device.

For example, the controller may control suitable valving, such as one or more flow control valves, provided in material flow passages fluidly connected to the extruder.

The controller may include a mix speed controller configured to control speed of the mixing device depending on the viscosity and/or other rheological properties measured by the measuring device.

One or more of the feed materials may be selected from the group consisting of: polymeric, metallic, ceramic, and/or composites, which may be selected in a well-known manner to build the desired three-dimensional object.

One or more of the feed materials may be provided in solidified filament form or may be provided in flowable form, such as a paste.

One or more of the feed materials may be a thermally liquefiable material in solidified filament form.

One or more of the feed materials may solidify or liquefy at a predetermined temperature depending on the type of material type and/or its composition.

One or more of the feed materials may include acrylonitrile-butadiene-styrene terpolymer (ABS), polycarbonate (PC), poly(meth)acrylate, polyphenylene sulfone (PPSU), HDPE, polyetherimide (PEI), polyetheretherketone (PEEK), and polylactic acid (PLA).

At least one of the two or more feed materials may be different from another one of the two or more feed materials for creating different blended alloy compositions.

An additive manufacturing apparatus may include a build platform and the material deposition system according to the foregoing description.

According to another aspect of the invention, a method for forming a three-dimensional article includes: (i) supplying two or more thermally liquefiable feed materials in solidified form to a moveable extrusion head; (ii) liquefying the two or more feed materials into a flowable state; (iii) mixing the two or more flowable feed materials in the extrusion head to create a flowable blended deposition material; (iv) measuring the viscosity and/or other rheological properties of the two or more flowable feed materials or the flowable blended deposition material; (v) controlling one or more parameters associated with the two or more flowable feed materials and/or the flowable blended deposition material depending on the measured viscosity and/or other rheological properties of the two or more flowable feed materials or the flowable blended deposition material; and (vi) dispensing the flowable blended deposition material from the extrusion head.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

A material deposition system for additive manufacturing including an extruder and a measuring device for measuring the viscosity and/or other rheological properties of a build material contained within the extruder. The measuring device may provide feedback to a controller for controlling one or more parameters depending on the measured viscosity and/or other rheological properties of the build material within the extruder. Two or more feed materials may be supplied to the extruder and a mixing device may be configured to mix the feed materials within the extruder to create a blended deposition material. The mixing device may be operatively coupled to the measuring device for simultaneously measuring the viscosity and/or other rheological properties of the materials during mixing. The controller may be configured to independently control one or more parameters associated with the feed materials and/or the blended deposition material depending on the viscosity and/or other rheological properties measured by the measuring device.

It is understood that the principles of the present invention have particular application to material deposition systems for fused-filament fabrication (FFF), also referred to as fused-deposition modeling (FDM), and thus will be described below chiefly in this context. It is also understood that principles of this invention may be applicable to other material deposition systems for additive manufacturing where it is desirable to provide feedback control based on measuring viscosity and/or other rheological properties of a material within an extrusion head, and particularly for improved feedback control for adjusting the properties of a blended or alloyed material contained in the extrusion head prior to, or simultaneously with, deposition.

Figure 1:
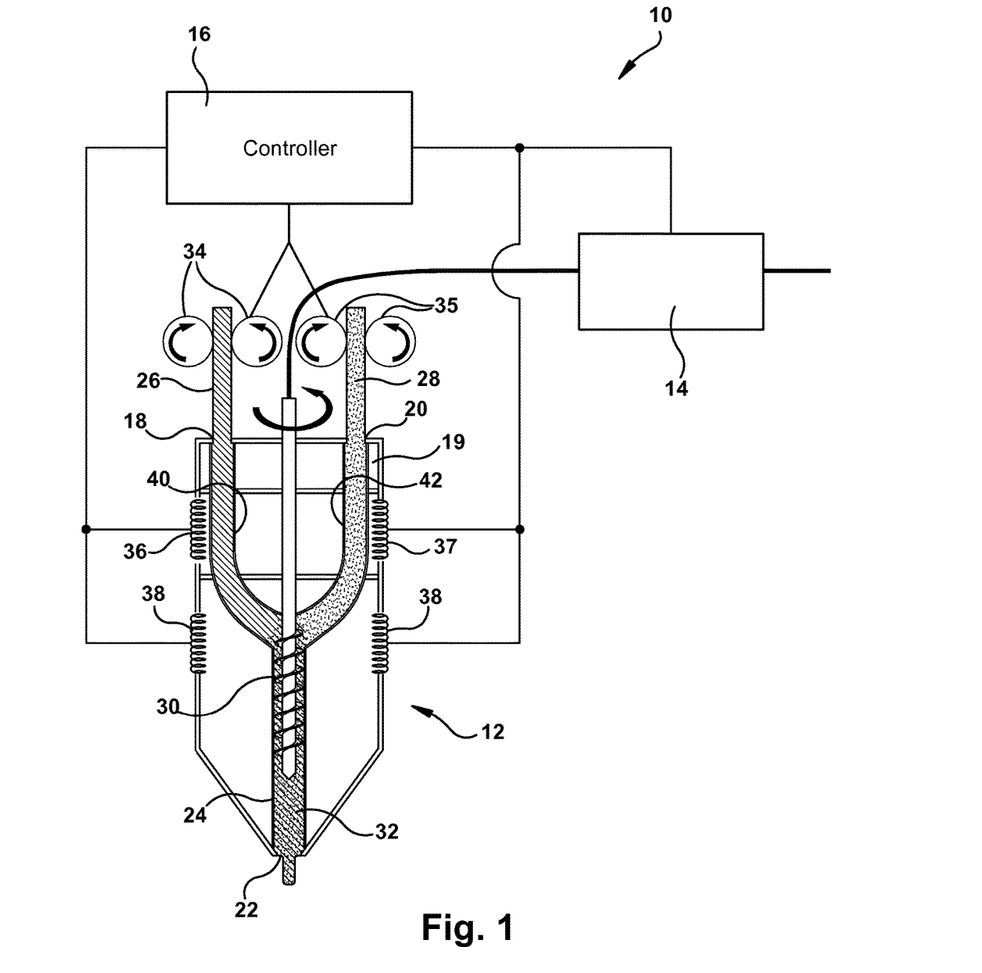
FIG. 1 is a schematic view of an exemplary material deposition system including an exemplary extruder in cross-sectional view.

Referring to FIG. 1, an exemplary material deposition system 10 is shown. Generally, the material deposition system 10 includes an extruder 12 for dispensing a build material, a measuring device 14 configured to measure the viscosity and/or other rheological properties of the build material contained within the extruder 12, and a controller 16 configured to control one or more parameters depending on the viscosity and/or other rheological properties measured by the measuring device 14.

The extruder 12 may include one or more input ports or passages (e.g., a first input port 18 and a second input port 20), an extrusion port 22 or nozzle, and a chamber 24 interposed between the input ports 18, 20 and the extrusion port 22 for containing a build material.

Each input port 18, 20 may receive a feed material 26, 28 (e.g., a build material) that is supplied to the chamber 24. The input ports 18, 20 may be provided in a manifold 19 of the extruder 12 that defines passages for supplying the materials 26, 28 to the chamber 24. It will be understood that while two input ports are shown, any number of ports, and any corresponding number of feed materials may be used.

In the illustrated embodiment, the feed materials 26, 28 are provided in filament form (filaments) for entering the respective input ports 18, 20. One or more of the feed materials 26, 28 may include solidified polymeric materials, such as thermoplastic materials, which may solidify or liquefy at a predetermined temperature, depending on the type and composition of the material, among other factors well-known in the art.

In the illustrated embodiment, the chamber 24 is configured as a mixing chamber 24, and the extruder 12 further includes a mixing device 30 disposed in the mixing chamber 24. The mixing device 30 may be configured to mix the feed materials 26, 28 in the mixing chamber 24 to create a blended deposition material 32. At least one of the feed materials 26, 28 may be different from another one of the feed materials 26, 28 for creating different compositions of the blended deposition material 32 with the mix ratio controllably determined by the mass or volume feedrates of the filaments (or input materials if they are not in filament form) supplied to the mixing chamber 24. It will be understood that while the feed materials 26, 28 are shown and described as polymer filaments, other types and forms of feed materials may be used. Generally, the feed materials 26, 28 may be selected in a suitable manner to create the blended deposition material 32 depending on the desired features of the three-dimensional object to be fabricated, as will be further understood with description to follow.

The measuring device 14 may be configured to measure the viscosity and/or other rheological properties of the feed materials 26, 28 and/or the blended deposition material 32 in the mixing chamber 24. The controller 16 may be configured to control one or more parameters associated with the feed materials 26, 28 and/or the blended deposition material 32 depending on the viscosity and/or other rheological properties measured by the measuring device 14. The blended deposition material 32 may be used as a build material, which may be extruded through the extrusion port 22 for deposition and fabrication of a three-dimensional object.

It is understood that the material deposition system 10 may be used as a part of an additive manufacturing system or apparatus. The additive manufacturing apparatus may also include a frame, a build platform, a vertical motion (Z) drive system, a lateral motion (Y) drive system, and an orthogonal lateral motion (X) drive system, which function in a suitable manner well-known in the art. For example, the build platform may be movable relative to the frame via Z drive and Y drive, and the extruder 12 (also referred to as an extrusion head) may be movable relative to frame via X drive. Many other configurations are possible including systems in which the build platform is stationary and the extrusion head moves in two or three drive axes. The material deposition system 10 described herein may be applicable to nearly any additive manufacturing system configuration that is able to use material feedstock fed through conduits or passages.

The material deposition system 10 may include one or more actuators 34, 35 associated with the feed materials 26, 28 for feeding the respective feed materials through the input ports 18, 20 toward the chamber 24. The actuators 34, 35 may include motors, such as stepper motors, which may be selected in a suitable manner well-known in the art. The actuators 34, 35 may convey the respective feed materials 26, 28 through the input ports 18, 20 toward the chamber 24 with prescribed feed forces and feed rates depending on the system requirements, and may be individually controlled to supply one or more of the feed materials to the chamber 24. In the illustrated embodiment, two actuators 34, 35 associated with respective feed materials 26, 28 are shown, however other numbers of filaments and actuators are also possible. For example, systems with 3, 4, 5, 6 or more feed materials and actuators are equally feasible. The blended deposition material 32 may be deposited while the extruder 12 and/or build platform are moved. The blended deposition material 32 may be deposited in shapes and layers as desired to construct a part in nearly any desired three dimensional shape. As will be described in further detail below, the ability to mix materials and/or colors in any combination or ratio while monitoring the viscosity and/or other rheological properties of the blend greatly enhances the range of capabilities of such manufacturing systems.

The material deposition system 10 may also include (or may be in thermal communication with) one or more heating elements 36, 37, 38 configured to heat and/or liquefy the feed materials 26, 28 and/or the blended deposition material 32. As used herein, the term "liquefied" or "liquefaction" includes heating to a temperature, or maintaining at a temperature, above the melting point (or glass transition temperature) of the material being heated for effecting a flowable or fluid state of the material.

In the illustrated embodiment of FIG. 1, the extruder 12 may include liquefication passages 40, 42, or chambers, associated with the respective input ports 18, 20 for receiving the respective feed materials 26, 28. In general, each of the liquefication passages 40, 42 may be in thermal communication with a corresponding heating element 36, 37 for heating and/or liquefying the respective feed materials 26, 28. The liquefication passages 40, 42 may be coextensive with the chamber 24, or the liquefication passages 40, 42 may extend beyond the chamber 24 towards the input ports 18, 20, so that the feed materials 26, 28 are likely to be melted before they enter the chamber 24, or so that the feed materials 26, 28 are closer to their respective liquefication temperatures as they enter the liquefication passages or chamber 24. The liquefication passages 40, 42 may be configured to deliver the respective liquefied feed materials 26, 28 downstream toward the mixing chamber 24.

Alternatively or additionally, the extruder 12 may include a heating element 38 in thermal communication with the mixing chamber 24 for heating and/or further liquefying the feed materials 26, 28 as they enter the chamber 24, or for heating the blended deposition material 32 to a prescribed temperature.

The mixing device 30 is disposed within the mixing chamber 24 for mixing the flowable (e.g., liquefied) feed materials 26, 28 as they enter the chamber 24. In the illustrated embodiment, the mixing chamber 24 is cylindrical and the mixing device 30 extends along a longitudinal axis of the chamber 24, and is spaced from an interior surface of the mixing chamber 24 to define an annulus that contains the feed materials 26, 28 and the blended deposition material 32. In this manner, as the feed materials 26, 28 are mixed in the annulus by the mixing device 30 to create the blended deposition material 32, the materials are forced downward (as viewed in FIG. 1) through the annulus toward the extrusion port 22.

The mixing device 30 may include a static mixer, a dynamic mixer, or may include features of both static and dynamic mixing. For example, the mixing device 30 may include a static mixer having one or more baffles within the flow path of the feed materials 26, 28. The term "baffle" as used herein is intended to describe any protuberance, cross-member, finger, or other physical feature within a flow path from the input ports 18, 20 to the extrusion port 22 that diverts or changes flow in a manner that encourages mixing of the two feed materials 26, 28. The baffles may include spiral ridges or other torsion inducing elements along interior walls of the chamber 24 to swirl the feed materials 26, 28 down toward the extrusion port 22. A variety of geometric configurations may be used for such spiral ridges, including various pitches (distance from one turn to the next) and various heights (amount that ridge protrudes into build cavity). The static mixing elements may be formed from wire, sheet metal, or some other material or process well-known in the art.

Alternatively or additionally, the mixing device 30 may be a dynamic mixer for providing active mixing techniques of the feed materials 26, 28. For example, the dynamic mixer may have a central shaft that is rotatable about the central axis and may have mixing blades or a helical screw-type structure for shearing the feed materials 26, 28 to create the blended material 32. A variety of dynamic mixing devices may be provided, such as a helical blade mixer, a change can mixer, a double arm kneading mixer, a continuous mixer, a single-screw extruder, a Banbury mixer, a plow mixer, a ribbon mixer, a cone and screw mixer, twin-screw extruders (e.g., tangential counter-rotating, intermeshing counter-rotating, intermeshing co-rotating), a Farrel continuous mixer, which may be used alone or in combination to facilitate mixing of the feed materials 26, 28. Similarly, a number of mixing enhancers may be provided to improve such active mixing, such as parallel interrupted mixing flights, a ring barrier, mixing pins, a Maddock mixing section, hexalobal mixing screws, kneading paddles, and so forth. Any of the foregoing might be usefully adapted to provide dynamic mixing of the feed materials 26, 28 within the mixing chamber 24.

As discussed above, the measuring device 14 may be configured to measure the viscosity and/or other rheological properties of the feed materials 26, 28 and/or the blended deposition material 32 in the mixing chamber 24. The measuring device 14 may include apparatus, devices, and machines for measuring viscosity and/or other rheological properties, including by way of example a controller, such as a strain controller, a programmable processor, a computer, or multiple controllers, processors, or computers.

In some embodiments, the measuring device 14 may be configured as a viscometer for measuring viscosity of the flowable materials 26, 28, 32. The viscometer may be a rotational viscometer configured to measure the torque required to turn an object in the flowable material at a known speed. More particularly, the viscometer may be operatively coupled to the mixing device 30 for measuring the torsional forces (either directly or indirectly) generated during the mixing of the feed materials 26, 28 to create the blended deposition material 32.

As used herein, an "operative" or "operable" coupling, or a coupling by which entities are "operatively coupled," is one in which the entities are connected or coupled in such a way that the entities may perform as intended. An operative coupling may be a direct coupling or connection, or an indirect coupling or connection in which an intermediate entity or entities cooperate or otherwise are part of the connection or are in between the operatively coupled entities.

In some embodiments, the mixing device 30 may be configured as a dynamic mixer having a central shaft that is operatively coupled to a spindle of the viscometer. The central shaft of the mixing device 30 and the spindle of the viscometer may be rotationally driven by a motor of the viscometer, such as a stepper motor or servo motor. In response to the resistance from shearing the flowable materials e.g. 26, 28, 32, a torque may be applied to the dynamic mixer, and a sensor of the viscometer operatively coupled to the spindle and/or the dynamic mixer may be used to measure this torque (either directly or indirectly). A processor or controller of the viscometer may convert the measured torque into a shear stress value that may be used to determine the viscosity of the material being measured. In this manner, the mixing device 30 may be considered to take the place of the "rotor" or "bob" that is typically connected to the spindle in a conventional rotational viscometer. As such, even though the mixing device 30 may be operatively coupled to the viscometer, it is understood that the term "operatively coupled" can also mean that the mixing device 30 may be integral with the measuring device 14 to constitute a portion of the viscometer itself, for example, taking the place of the rotor in a conventional viscometer as described above; or the mixing device 30 may be integral with the measuring device 14 to constitute the entire spindle assembly of the viscometer that is driven by the viscometer motor.

It is understood that various configurations of the viscometer and/or mixing device are possible. For example, for more precise viscosity measurements, the torque measurement may generally take place by means of the power consumption of driving the electric motor of the viscometer, such that high-speed microprocessors may measure the speed of the spindle or shaft from a digital encoder to calculate the electrical current required to drive the spindle or shaft at a constant speed. In this case, the current required to drive the motor is proportional to the viscosity of the material being measured. For more simple and inexpensive apparatus, a spring or torsion element may be used for measuring torque, e.g. coil springs or spring wires, such as in a typical Brookfield-type viscometer. Such torsion elements may exhibit a deflection path or a deflection angle that may be measured by a sensor (e.g., capacitive sensor), and the measured deflection angle is proportional to the applied force or torque used to calculate viscosity. Any of the foregoing may be usefully adapted to mixing device 30 and/or the viscometer for measuring viscosity.

Alternatively or additionally, the measuring device may include a rheometer for measuring rheological properties of the flowable materials e.g., 26, 28, 32. The rheometer may be a rotational or shear-type rheometer configured to measure the torque required to turn an object in the flowable material at a known speed. For example, the rheometer may be adapted as either a native strain-controlled instrument (control and apply a user-defined shear strain which can then measure the resulting shear stress) or a native stress-controlled instrument (control and apply a user-defined shear stress and measure the resulting shear strain). More particularly, the rheometer may be operatively coupled to the mixing device 30 for measuring the torsional forces (either directly or indirectly) generated during the mixing of the two or more feed materials and/or the mixing of the blended deposition material.

For example, the mixing device 30 may be configured as a dynamic mixer having a central shaft extending along a longitudinal axis of the mixing chamber 24. The dynamic mixer may be spaced from an interior cylindrical wall of the mixing chamber 24 to define the annulus in which the flowable materials e.g., 26, 28, 32 are contained and mixed. The interior cylindrical wall of the mixing chamber 24 may be configured as a sleeve that may be rotatably displaceable relative to the mixing device 30, and which may be operatively coupled to the rheometer to measure (either directly or indirectly) force acting on the sleeve and/or displacement of the sleeve. The central shaft of the mixing device 30 may be rotationally driven by a motor of the rheometer at a set speed, which determines the shear rate inside of the annulus. As the mixing device 30 rotates and mixes, a force may be exerted on the sleeve in response to the resistance of the flowable material in the annulus. A sensor of the rheometer may be operatively coupled to the sleeve to measure this force or torque (either directly or indirectly), and a processor or controller of the rheometer may convert the measured force into a shear stress value that may be used to determine the rheological properties of the material being measured. In this manner, the mixing device 30 may be considered to take the place of the central cylinder in a conventional rotational cylinder rheometer. Optionally, such a central cylinder may be provided, which may be spaced from the interior cylindrical wall of the mixing chamber 24 and may be operatively coupled to the mixing device 30 for measuring rheological properties similar to a conventional rotational cylinder rheometer. The central cylinder may be operatively coupled to a sensor for measuring force or torque to be converted into a shear stress value in a similar manner as the sleeve described above. As such, even though the mixing device 30 may be operatively coupled to the rheometer, it is understood that the term "operatively coupled" can also mean that the mixing device 30 may be integral with the measuring device 14 to constitute a portion of the rheometer itself, for example, taking the place of the central cylinder in a conventional rheometer as described above; or the mixing device 30 may be integral with the mixing device 14 to constitute the entire central cylinder assembly of the rheometer that is driven by the rheometer motor. It is also understood that the sleeve may instead be rotated at a set speed, and the mixing device 30 may be configured to measure the force exerted by the flowable material in the annulus.

The principles of measuring viscosity or other rheological properties with a viscometer or rheometer are well-known in the art, and various types of viscometers or rheometers other than those described above may be employed in the material deposition system 10 in a suitable manner as would be understood by those having ordinary skill in the art.

Figure 2:
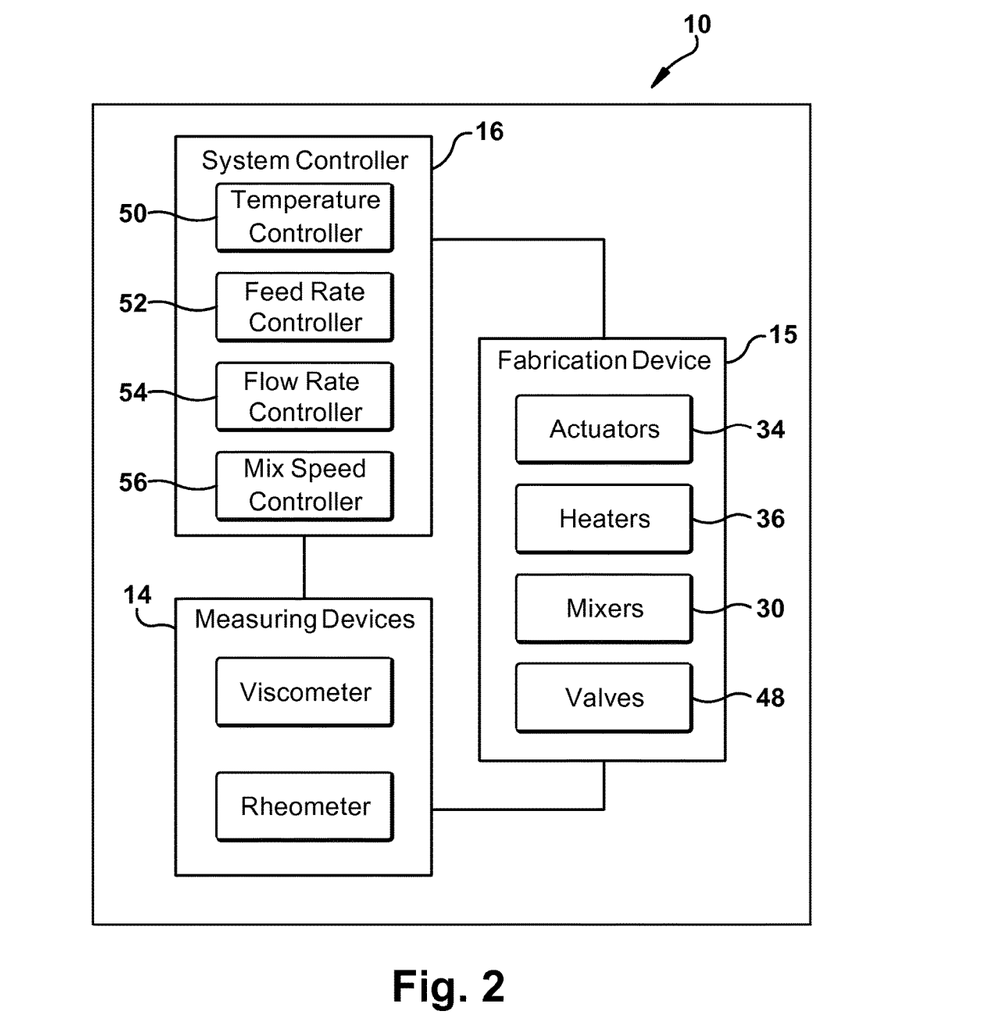
FIG. 2 is a schematic block diagram of the exemplary material deposition system of FIG. 1.

Referring to FIG. 2, a schematic block diagram of the material deposition system 10 is shown. As discussed above, the controller, or system controller, 16 may be configured to control one or more parameters associated with the feed materials 26, 28 and/or the blended deposition material 32 depending on the viscosity and/or other rheological properties measured by the measuring device 14. In this manner, the controller 16 may be operatively coupled in a communicating relationship to one or more measuring devices 14 and to one or more fabrication devices 15.

As used herein, an "operable" or "operative coupling," or a connection or coupling by which entities are "operatively coupled," may include one in which signals, physical communications, or logical communications may be sent or received. Typically, an operative coupling includes a physical interface, an electrical interface, or a data interface, but it is to be noted that an operative coupling may include differing combinations of these or other types of connections sufficient to allow operable control. For example, two entities can be operatively coupled by being able to communicate signals to each other directly or through one or more intermediate entities like a processor, operating system, a logic, software, or other entity. Logical or physical communication channels can be used to create an operative coupling.

As shown in FIG. 2, the measuring device 14 may include a viscometer and/or rheometer configured to measure the viscosity or other rheological properties of the feed materials 26, 28 and/or the blended deposition material 32. In addition, the fabrication devices 15 may include one or more of the actuators 34 and 35, the heating elements 36, 37 and 38, the mixing device 30, and optionally one or more flow control valves 48 that may be provided in the fluid flow path of the feed materials 26, 28 and/or the blended deposition material 32. Any of the foregoing entities may be operatively coupled to the controller 16 either alone or in combination for controlling one or more parameters associated with the feed materials 26, 28 and/or the blended deposition material 32.

For example, one parameter that may be usefully controlled according to an analysis of the measuring device 14 is the feed rate of the feed materials 26, 28. For example, the controller 16 may include a feed controller 50 that is operatively coupled to each of the actuators 34 and 35 for independently controlling feed rate of each of the feed materials 26 and 28 being supplied toward the mixing chamber 24 depending on the viscosity and/or other rheological properties of the materials measured by the measuring device 14. Such feature is described in further detail below with reference to step 116 of FIG. 3.

Another parameter that may be usefully controlled according to an analysis of the measuring device 14 is the temperature of the feed materials 26, 28 and/or the blended deposition material 32. For example, the controller 16 may include a temperature controller 52 that is operatively coupled to each of the heating elements (e.g. 36, 37, and/or 38) for independently controlling temperature of the feed materials 26, 28 and/or the blended deposition 32 material depending on the viscosity and/or other rheological properties measured by the measuring device 14. Optionally, the controller 16 and/or the temperature controller 52 may be operatively coupled to a cooling means, such as active thermoelectric cooling or heat exchanger, for controlling temperature of the feed materials 26, 28 and/or the blended deposition material 32 in a similar manner. Such features are described in further detail below with reference to step 118 of FIG. 3

Yet another parameter that may be usefully controlled according to an analysis of the measuring device 14 is the speed of the mixing device 30, such as the dynamic mixer, for mixing the feed materials 26, 28 to create the blended deposition material 32. For example, the controller 16 may include a mix speed controller 56 that is operatively coupled to the mixing device 30 for controlling the mixing speed depending on the viscosity and/or other rheological properties measured by the measuring device 14. Such feature is described in further detail below with reference to step 120 of FIG. 3

Still another parameter that may be usefully controlled according to an analysis of the measuring device 14 is the flow rate of the deposition material exiting the extrusion port 22. For example, the controller 16 may include a flow rate controller 54 that is operatively coupled to one or more flow control valves 48 for controlling flow rate of the deposition material exiting the chamber 24 depending on the viscosity and/or other rheological properties measured by the measuring device 14. Such feature is described in further detail below with reference to step 122 of FIG. 3

It is understood that other variations for adjusting the parameters of feed rate, temperature, flow rate, mixing speed, etc. depending on the viscosity and/or other rheological properties of the blend 32 are possible, as would be understood by those having ordinary skill in the art. It is also understood that other parameters other than those described above may be controlled by the controller depending on the viscosity and/or other rheological properties of the materials measured by the measuring device, such as those parameters associated with the temperature and/or shear rate of the feed materials or blended material, as would be understood by those having ordinary skill in the art.

Figure 3:
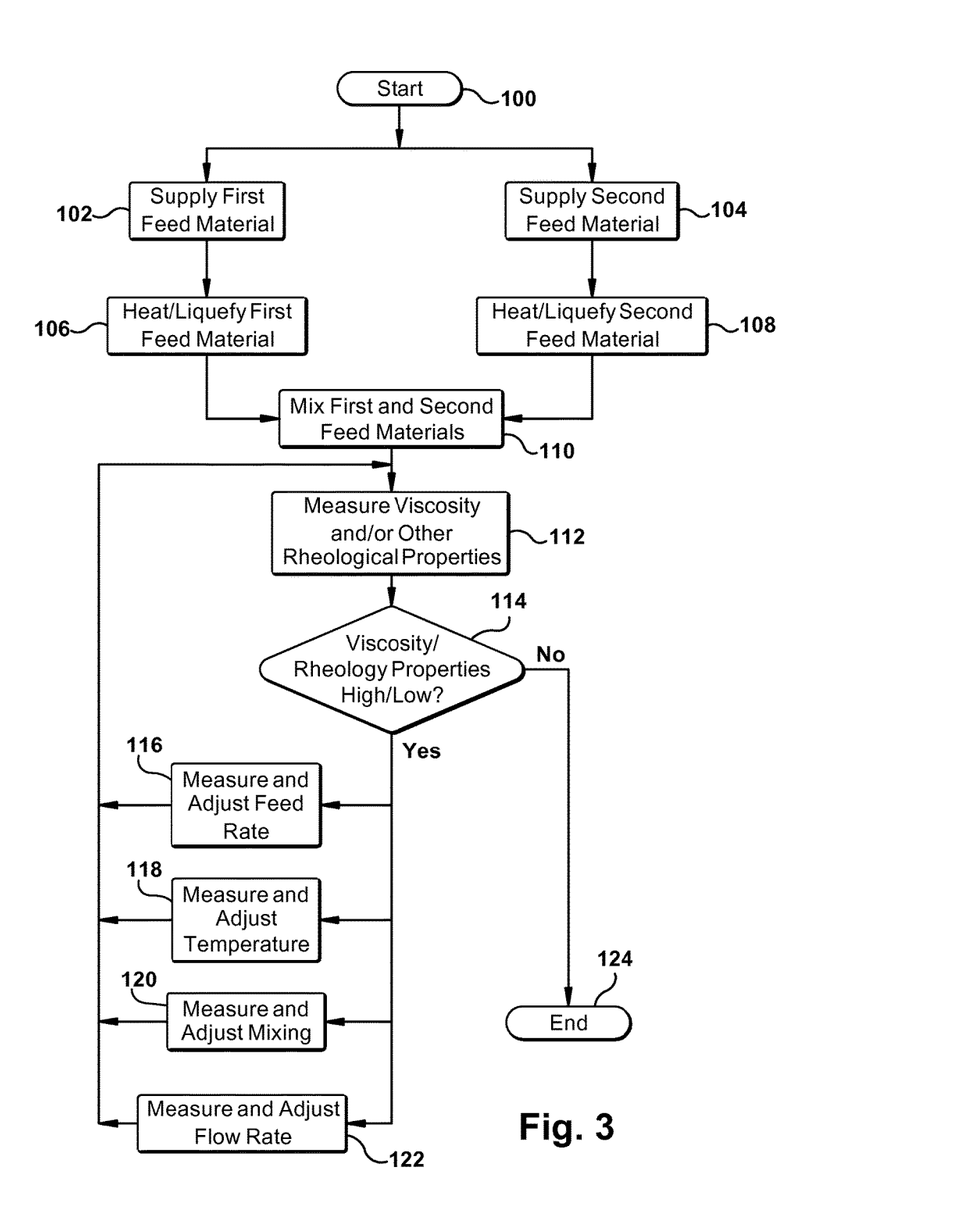
FIG. 3 is a flow-diagram of an exemplary process for controlling and depositing materials for additively manufacturing a three-dimensional object.

Referring to FIG. 3, a flow-chart of an exemplary basic operation of the material deposition system for additive manufacturing a three-dimensional object is shown. The method may begin before step 100 by identifying a model for the object and/or fabrication instructions for the object. An object model may be any computer-readable file or files that collectively specify the structure, materials, and/or colors of the object. This may, for example include CAD files, STL files, and the like that provide three-dimensional descriptions of the object. Fabrication instructions corresponding to a model may be any collection of instructions that, when carried out by an additive manufacturing apparatus or three dimensional printer, result in the fabrication of the object. For example, fabrication instructions may include a series of instructions for moving to various x,y,z coordinates, extruding build material, controlling temperature, feed rate, mixing speed, flow rate, etc.

As shown in FIG. 3, the exemplary process begins at 100. At steps 102 and 104, two or more of the feed materials may be supplied to the extrusion head, which may be moveable in x,y,z coordinates. The feed materials may be provided in solidified form (e.g., thermoplastic filaments) and may be thermally liquefiable into a flowable or fluid state. The feed materials may be supplied simultaneously or consecutively toward the mixing chamber. The feed rate of the feed materials may be independently controlled by the one or more actuators for being supplied at the same feed rate or different feed rates with respect to each other.

At steps 106 and 108, the feed materials may be liquefied into a flowable state. For example, the one or more heaters may be configured to heat and/or maintain the temperature of the feed materials to a temperature above the melt temperature (or glass transition temperature) of the feed materials. The feed materials may be heated simultaneously or consecutively prior to entering the mixing chamber. The temperature of the feed materials may be independently controlled by respective heating elements for being heated to the same temperature or different temperatures with respect to each other.

At step 110, the flowable feed materials may be supplied to the mixing chamber and may be mixed by the mixing device to create a flowable blended deposition material. The feed materials may be mixed to a desired mix uniformity including homogenous or heterogeneous mixtures. The mixing device may be a static or dynamic mixer, as described above. As the materials are blended together they may be forced toward the extrusion port of the extrusion head.

At step 112, the viscosity and/or other rheological properties of the feed materials and/or the blended deposition material may be measured by the measuring device. One or more of the measuring devices may be provided. In some embodiments, the measuring device may measure the viscosity and/or other rheological properties of the flowable feed materials individually or in combination. In some embodiments, the measuring device may measure the viscosity and/or other rheological properties of the flowable blended deposition material individually or in combination with the flowable feed materials. As discussed above, the measuring device may be operatively coupled to, such as being integral with, the mixing device for simultaneously measuring the viscosity and/or other rheological properties of the material or materials contained in the mixing chamber during mixing. In some embodiments the measuring device may be configured as a viscometer for measuring viscosity. In some embodiments the measuring device may be configured as a rheometer for measuring rheological properties.

At steps 114 to 122, the controller may control one or more parameters associated with the feed materials and/or the blended deposition material depending on the viscosity and/or other rheological properties of the feed materials or the blended deposition material as measured by the measuring device. The controller may be operatively coupled in a communicating relationship with the measuring device and one or more of the fabrication devices, such as the actuators, the heating elements, the mixing device, the flow control valves, etc. In this manner, the controller may receive information from the measuring device for indicating the viscosity and/or other rheological properties of the feed materials and/or the blended deposition material, and may receive information from the fabrication devices for indicating the present state thereof, for example, the current feed rate, temperature, mix speed, and/or flow rates, etc. The controller may include submodules such as the temperature controller, the feed rate controller, the flow rate controller, and the mix speed controller for measuring and adjusting the associated parameters, however, it is also understood that the various controllers may be separate from one another and independently controlled by the system controller. It is understood that one or more of the following steps 114 to 122 may be performed simultaneously or in conjunction with one another, or consecutively and separately from each other, as required.

At step 114, the controller may receive information from the measuring device to determine whether the desired viscosity and/or other rheological properties of the feed materials and/or the blended deposition material is too high or too low. If the measured viscosity and/or other rheological properties are at the prescribed level or within the tolerance limits thereof, then the process will move to step 124, discussed below. If the measured viscosity and/or other rheological properties are above or below the prescribed level or outside the tolerance limits thereof, then the controller may measure and adjust the one or more parameters as indicated in steps 116 to 120.

For example, at step 116, the controller may control the parameter of feed rate by measuring the present feed rates of the feed materials and adjusting the feed rates accordingly based on the viscosity and/or other rheological properties measured by the measuring device.

By way of a non-limiting example, the measured viscosity of the blended material may be indicative of the ratio of each of the different feed materials in the blend, such that if the first feed material is known to have a higher viscosity at a certain temperature than the second different feed material, then a measured low viscosity of the blend may be indicative of a lower ratio of the first feed material to the second feed material. The controller and/or feed controller being operatively coupled to the measuring device may receive the information relating to the viscosity of the blended material, and may measure and adjust the feed rate of the feed materials accordingly. For example, the feed controller may provide an output signal to the respective actuators to increase the feed rate of the first feed material and decrease the feed rate of the second feed material for effecting a higher viscosity of the blend. In this manner, the controller and/or feed controller may continuously monitor the viscosity of the blend and measure and adjust the feed rate of the feed materials in a continuous feedback loop so as to provide the desired blend composition and/or mix uniformity.

At step 118, the controller may control the parameter of temperature by measuring the present temperatures of the feed materials and/or the blended deposition material and adjusting the temperatures accordingly based on the viscosity and/or other rheological properties measured by the measuring device.

By way of a non-limiting example, the measured viscosity of the blended deposition material may be indicative that the first feed material has a higher viscosity than the second feed material at a certain temperature, which could impact blend uniformity, deposition rate, and/or deposition shape. The controller and/or temperature controller being operatively coupled to the measuring device may receive the information relating to the viscosity of the blended material, and may measure and adjust the temperature of the respective feed materials accordingly. For example, the temperature controller may provide an output signal to the heating element associated with the first feed material to increase the temperature of the first feed material for effecting a lower viscosity of the blend. In this manner, the controller and/or temperature controller may continuously monitor the viscosity of the blend and measure and adjust the temperature of the feed materials in a continuous feedback loop.

In another example of temperature control, the measured viscosity of the deposition material in the chamber may be indicative of the deposition rate of the extrusion, or may be indicative of the shape and quality of the extrusion bead, as well as appropriate adhesion to underlying layers of build material. For example, if the viscosity of the deposition material is too low, then the extrusion bead may not be able to maintain sufficient shape or form. The controller and/or temperature controller being operatively coupled to the measuring device may receive the information relating to the viscosity of the deposition material in the chamber, and may measure and adjust the temperature of the deposition material by providing an output signal to the heating element associated with the chamber to decrease the temperature of the deposition material for effecting a higher viscosity. In this manner, the size and/or shape of the extrusion bead may be tailored or optimized, and the consistency of the extrusion bead may be improved.

At step 120, the controller may control the parameter of mixing speed by measuring the present speed of the mixing device and adjusting the speed accordingly based on the viscosity and/or other rheological properties measured by the measuring device.

By way of a non-limiting example, the measured viscosity of the blended deposition material may be indicative that the blended deposition material exhibits thixotropic behavior, such that higher mixing speeds may result in lower viscosities of the blend. This could impact blend uniformity, deposition rate, and/or deposition shape. The controller and/or the mix speed controller being operatively coupled to the measuring device may receive the information relating to the viscosity of the blended material, and may measure and adjust the mixing speed of the mixing device accordingly. For example, if the blended deposition material exhibits thixotropic behavior and the measured viscosity is too low, then the mix speed controller may provide an output signal to the mixing device to decrease the mixing speed for effecting a lower viscosity of the blend. In this manner, the controller and/or the mix speed controller may continuously monitor the viscosity of the blend and measure and adjust the speed of the mixing device in a continuous feedback loop.

At step 120, the controller may control the parameter of the flow rate by measuring the present flow rate of the deposition material exiting the extrusion port and adjusting the flow rate accordingly.

By way of a non-limiting example, the measured viscosity of the deposition material in the chamber may be indicative of the deposition rate of the extrusion, or may be indicative of the shape and quality of the extrusion bead, as well as appropriate adhesion to underlying layers of build material. For example, if the viscosity of the deposition material is too low, then the extrusion bead may not be able to maintain sufficient shape or form. The controller and/or flow rate controller being operatively coupled to the measuring device may receive the information relating to the viscosity of the deposition material in the chamber, and may measure and adjust the one or more flow control valves to increase or decrease the flow rate of the deposition material exiting the extrusion port. In this manner, the size and/or shape of the extrusion bead may be tailored or optimized, and the consistency of the extrusion bead may be improved.

It is understood that the foregoing description is not limited to thermally liquefiable materials in solidified form (e.g., thermoplastic filaments), and may be applicable to other materials selected in a suitable manner depending on the desired features of the three-dimensional object to be fabricated with the blended deposition material.

For example, one or more of the feed materials may include an acid-, base- or water-soluble polymer. For example, one or more of the feed materials may include polymeric materials such as: acrylonitrile-butadiene-styrene terpolymer (ABS), polycarbonate (PC), poly(meth)acrylate, polyphenylene sulfone (PPSU), polyethylene (PE), high-density polyethylene (HDPE), polyetherimide (PEI), polyetheretherketone (PEEK), polylactic acid (PLA), and other similar polymers. In some embodiments, one or more of the feed materials may be provided in flowable form, such as a paste. In some embodiments, one or more of the feed materials may include a thermoset polymer, such as epoxy or phenolic, which may be thermally treated to cure and harden the material. In some embodiments, one or more of the feed materials may include metals or metal alloys, ceramics, or may be provided in composite form, including fiber-reinforced composites. One or more of the feed materials may solidify or liquefy at a predetermined temperature, depending on the type and composition of the material, among other factors well-known in the art.

At least one of the feed materials may be different from another one of the feed materials for creating different compositions of the blended deposition material with the mix ratio controllably determined by the mass or volume feedrates of the filaments (or input materials if they are not in filament form) supplied to the mixing chamber. For example, one or more of the feed materials may include different types of constituents in the base material, such as elastomers (e.g., rubber), harder materials (e.g., ceramics or materials having a Mohs' hardness of five or greater), softer materials (e.g., minerals or materials having a Mohs' hardness of less than five), conductive materials (e.g., metals, carbons, graphites, graphene, carbon nanotubes, etc.), reinforcing materials (e.g., fibrous materials, such as chopped carbon fiber or fiberglass), fluxes, lubricants, plasticizers, pigments (e.g., colorants), fillers, and/or other additives.

By way of a non-limiting example, one or more of the feed materials may include different colors of similar base materials which may be mixed together in any ratio. If the correct filament input colors are chosen, nearly any desired output material color can be created. For example, using yellow and blue build material in equal proportions, a green build material can be produced, and the hue may be varied by feeding yellow at a greater or lesser volumetric or mass rate into the mixing chamber. Additionally, other appearance related effects can be created by including clear, metallic or pearlescent filaments as well. By monitoring the viscosity and/or other rheological properties of the blended material and adjusting parameters, such as temperature, accordingly, the size, shape, and consistency of the deposited material bead may be optimized.

In some embodiments, one or more of the feed materials may be different types of materials from each other that are mixed together with the mixing device to create different alloy compositions of the blended deposition material. The different types of materials may be different compositions and/or have different properties such as different melt points, melt viscosities, flow behaviors, miscibilities, etc. For example, one or more of the feed materials may include different types of polymers (e.g., homopolymers) that are blended together to create a polymer alloy. An example blend may include combining a polycarbonate (PC) homopolymer with a polyester homopolymer, like poly (butylene terephthalate) (PBT), to a get a unique polymer alloy that exhibits properties more than what each individual polymer would have offered. In this example, the PC/PBT blend could offer good impact resistance, better than a PBT homopolymer by itself, and good chemical resistance, better than PC homopolymer by itself.

By way of a non-limiting example, the actuators associated with the respective feed materials may be individually controllable through the controller to adjust the rate at which the different feed materials are supplied. By feeding materials of different types and/or having different constituents through the input ports into the chamber at different rates, the resultant blended deposition material may take on a range of properties. For example, where the first feed material is PC and the second feed material is PBT, a greater proportion of the PC component may be fed at selected times so that certain portions of the three-dimensional article may have greater impact resistance, while a greater proportion of the PBT component may be fed at other selected times so that certain other portions of the three-dimensional article may have greater chemical resistance.

In another non-limiting example, the first feed material may include a stronger or harder material for "structural supports" of the three-dimensional object, while the second feed material may include a weaker or softer, for example one that can later be subtractively removed, such that the resulting three-dimensional article may have overhangs, hollow areas, and/or thin-walled structures with the first material while maintaining good dimensional control during fabrication.

Other variations of mixing the two or more feed materials are possible, as would be understood by those having ordinary skill in the art.

At step 124, the exemplary process ends, which may include a step of dispensing the blended deposition material from the extrusion head through the extrusion port. The process may continue after step 124, where after dispensing the blended deposition material from the extrusion head, the material may flow as a continuous, fluid stream at a predetermined temperature above the temperature at which it solidifies onto a base member or build platform positioned proximal the extrusion port or nozzle of the extruder. Simultaneously with the dispensing of the material onto the base member, the base member and/or the extrusion head may be mechanically moved with respect to each other in a predetermined pattern to form a first layer of the deposited material on the base member. Thereafter, the extrusion head may be displaced by a predetermined layer thickness distance from the first layer, and after the portion of the first layer adjacent the nozzle has cooled and solidified, a second layer of the material in a fluid state may be dispensed onto the first layer from the dispensing outlet while simultaneously moving the base member and the extrusion head relative to each other, whereby the second layer solidifies upon cooling and adheres to the first layer to form a three-dimensional article. In this manner, multiple layers of the deposited material may be formed by being built up on top of each other in multiple passes by repeated dispensing of the material.

Based on the foregoing description, it is understood that the material deposition system described herein may enable improved in-process adjustment or changing of materials, colors and mix ratios while requiring only a single extrusion head, and may eliminate or reduce the need for pausing or purging during the deposition process, which significantly improves the capabilities of FFF and other material deposition systems. In addition, by enabling such in-process adjustment of the blend, multiple different alloy compositions may be created on-the-fly without the need to contact outside vendors to create a customized filament blend.

Advantageously, the exemplary material deposition system 10 may enable three-dimensional objects to be created in multiple materials and even variable ratio blends of different materials while requiring only a single extruder 12. More particularly, the material deposition system 10 may enable in-process changes to the ratio of the respective feed materials 26, 28 mixed together to create the blended deposition material 32 by providing feedback to the controller 16, and/or controllers 50, 52, 54, 56 based on the viscosity and/or other rheological properties of the feed materials 26, 28 and/or the blended deposition material 32, as measured by the measuring device 14. The controller 16 and/or controllers 50, 52, 54, 56 may then control one or more parameters (e.g., temperature, feed rate, flow rate, mix speed, etc.) depending on the viscosity and/or other rheological properties measured by the measuring device 14.

By simultaneously mixing the feed materials 26, 28 and measuring the viscosity and/or other rheological properties of the blended material 32, the desired degree of mix uniformity and/or alloyed composition may be determined and achieved. This may be particularly advantageous when the feed materials 26, 28 are of different compositions and/or have different material properties, such as different melt points, melt viscosities, flow behaviors, miscibilities, etc.

By providing such in-process adjustment of the mix ratios of the feed materials 26, 28, the composition and/or properties of the blended material 32 contained in the mixing chamber 24 may be adjusted just prior to, or simultaneously with, deposition of the blended material 32 to create the desired features of the three-dimensional part.

Furthermore, by measuring and altering the viscosity and/or other rheological properties of the deposition material contained within the chamber, the size and/or shape of the deposited extrusion bead may be tailored or optimized, and the consistency of the extrusion bead may be improved.

It is understood that embodiments of the subject matter described in this specification can be implemented in combination with digital electronic circuitry, or computer software, firmware, or hardware. Embodiments of the subject matter described in this specification can be implemented in an additive manufacturing system that uses one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "controller" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors encompass all apparatus, devices, and machines suitable for the execution of a computer program include, by way of example, both general and special purpose microprocessors, and any one or more processors of any kind of digital computer. Generally, a processor will receive instructions and data from a read-only memory or a random access memory or both. The essential elements of a computer may be a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A material deposition system for additive manufacturing comprising:
   an extruder having:
      two or more input ports for receiving two or more feed materials,
      a mixing chamber for receiving the two or more feed materials supplied from the two or more input ports,
      a mixing device for mixing the two or more feed materials in the mixing chamber to create a blended deposition material, and
      an extrusion port for extruding the blended deposition material;
   two or more actuators, each of the two or more actuators being configured to independently feed a respective one of the two or more feed materials at a feed rate toward the mixing chamber;
   a measuring device configured to measure the viscosity and/or other rheological properties of the blended deposition material in the mixing chamber; and
   a controller operatively coupled to the measuring device and operatively coupled to the two or more actuators;
   wherein the controller is configured to receive information from the measuring device corresponding to the measured viscosity and/or other rheological properties of the blended deposition material in the mixing chamber; and
   wherein the controller is configured to adjust the respective feed rates of the two or more actuators independently of one another in response to the information received from the measuring device corresponding to the measured viscosity and/or other rheological properties of the blended deposition material in the mixing chamber.

2. The material deposition system according to claim 1, wherein the mixing device includes a static mixer.

3. The material deposition system according to claim 1, wherein the mixing device includes a dynamic mixer.

4. The material deposition system according to claim 1, wherein the mixing device is operatively coupled to the measuring device.

5. The material deposition system according to claim 4, wherein the mixing device is integral with the measuring device.

6. The material deposition system according to claim 1, wherein the measuring device includes a viscometer.

7. The material deposition system according to claim 6, wherein the mixing device includes a dynamic mixer; and
   wherein the viscometer is operatively coupled to the dynamic mixer for measuring the torsional forces generated during the mixing of the two or more feed materials and/or the mixing of the blended deposition material.

8. The material deposition system according to claim 1, wherein the measuring device includes a rheometer.

9. The material deposition system according to claim 8, wherein the mixing chamber is cylindrical and wherein the mixing device is spaced from an interior surface of the mixing chamber to define an annulus therebetween; and
   wherein the rheometer is operatively coupled to the mixing device for measuring the torsional forces generated during the mixing of the two or more feed materials and/or the mixing of the blended deposition material in the annulus.

10. The material deposition system according to claim 1, further comprising one or more heating elements configured to heat the two or more feed materials and/or the blended deposition material.

11. The material deposition system according to claim 10, wherein the controller includes a temperature controller configured to control temperature as one of the one or more parameters of the controller;

wherein the temperature controller is operatively coupled to the one or more heating elements, the temperature controller being configured to control temperature of the two or more feed materials and/or the blended deposition material depending on the viscosity and/or other rheological properties measured by the measuring device.

12. The material deposition system according to claim 1, wherein the extruder includes two or more liquefication passages, each of the two or more liquefication passages being associated with a respective one of the two or more input ports for receiving a respective one of the two or more feed materials;
the material deposition system further including two or more heating elements, each of the two or more heating elements being in thermal communication with a corresponding one of the two or more liquefication passages, the two or more heating elements each being configured to independently heat and liquefy the respective feed materials, each of the liquefication passages being upstream of the mixing chamber and configured to deliver the respective liquefied feed materials downstream toward the mixing chamber;
wherein the temperature controller is operatively coupled to each of the two or more heating elements and is configured to adjust temperature of each of the two or more heating elements independently of one another in response to the information received from the measuring device corresponding to the measured viscosity and/or other rheological properties of the blended deposition material in the mixing chamber.

13. The material deposition system according to claim 12, further including a chamber heating element in thermal communication with the mixing chamber for heating the blended deposition material,
wherein the controller is operatively coupled to the chamber heating element to control temperature of the blended deposition material depending on the viscosity and/or other rheological properties measured by the measuring device.

14. The material deposition system according to claim 1, wherein the controller includes a mix speed controller configured to control speed of the mixing device depending on the viscosity and/or other rheological properties measured by the measuring device.

15. The material deposition system according to claim 1, wherein the controller includes a flow controller configured to control flow rate of the blended deposition material extruded from the extrusion port depending on the viscosity and/or other rheological properties measured by the measuring device.

16. The material deposition system according to claim 1, in combination with the two or more feed materials, wherein at least one of the two or more feed materials is different from another one of the two or more feed materials for creating different compositions of the blended deposition material.

17. An additive manufacturing apparatus comprising:
a build platform, and
the material deposition system according to claim 1.

18. A method for fabricating a three-dimensional article comprising:
providing the material deposition system according to claim 1;
supplying two or more feed materials in a flowable state to the mixing chamber of the extruder;
mixing the two or more flowable feed materials in the mixing chamber to create the blended deposition material;
measuring the viscosity and/or other rheological properties of the two or more flowable feed materials or the blended deposition material; and
controlling one or more parameters associated with the two or more flowable feed materials and/or the blended deposition material in response to the measured viscosity and/or other rheological properties of the two or more flowable feed materials and/or the blended deposition material; and
dispensing the blended deposition material from the extrusion port.

19. A material deposition system for additive manufacturing comprising:
an extruder having:
two or more input ports for receiving two or more feed materials,
two or more liquefication passages, each of the two or more liquefication passages being associated with a respective one of the two or more input ports for receiving a respective one of the two or more feed materials,
a mixing chamber downstream of the two or more liquefication passages for receiving the two or more feed materials from the two or more liquefication passages,
a mixing device for mixing the two or more feed materials in the mixing chamber to create a blended deposition material, and
an extrusion port for extruding the blended deposition material;
two or more heating elements, each of the two or more heating elements being in thermal communication with a corresponding one of the two or more liquefication passages, the two or more heating elements each being configured to independently heat and liquefy the respective feed material upstream of the mixing chamber to thereby deliver the respective liquefied feed material downstream toward the mixing chamber for mixing thereof;
a measuring device configured to measure the viscosity and/or other rheological properties of the blended deposition material in the mixing chamber; and
a controller operatively coupled to the measuring device and operatively coupled to the two or more heating elements;
wherein the controller is configured to receive information from the measuring device corresponding to the measured viscosity and/or other rheological properties of the blended deposition material in the mixing chamber; and
wherein the controller is configured to adjust temperatures of the two or more heating elements independently of one another in response to the information received from the measuring device corresponding to the measured viscosity and/or other rheological properties of the blended deposition material in the mixing chamber.

* * * * *